United States Patent
Kotera et al.

(10) Patent No.: US 10,093,290 B2
(45) Date of Patent: Oct. 9, 2018

(54) ELECTRIC BRAKE DEVICE

(71) Applicant: MITSUBISHI JIDOSHA KOGYO KABUSHIKI KAISHA, Tokyo (JP)

(72) Inventors: Haruo Kotera, Tokyo (JP); Hiromitsu Toyota, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/515,395

(22) PCT Filed: May 10, 2016

(86) PCT No.: PCT/JP2016/063806
§ 371 (c)(1),
(2) Date: Mar. 29, 2017

(87) PCT Pub. No.: WO2017/002452
PCT Pub. Date: Jan. 5, 2017

(65) Prior Publication Data
US 2017/0240147 A1    Aug. 24, 2017

(30) Foreign Application Priority Data
Jul. 2, 2015    (JP) .................................. 2015-133305

(51) Int. Cl.
*B60T 8/88*    (2006.01)
*B60T 8/17*    (2006.01)
(Continued)

(52) U.S. Cl.
CPC ................ *B60T 8/17* (2013.01); *B60T 1/065* (2013.01); *B60T 1/067* (2013.01); *B60T 7/042* (2013.01);
(Continued)

(58) Field of Classification Search
CPC . B60T 7/042; B60T 7/12; B60T 7/122; B60T 8/00; B60T 8/885; B60T 13/66; B60T 13/74; B60T 17/18; B60T 17/22
(Continued)

(56) References Cited

U.S. PATENT DOCUMENTS 5,810,454 A * 9/1998 Prinzler ................ B60T 8/1755
                                                    188/158
5,823,636 A * 10/1998 Parker ..................... B60T 7/042
                                                    188/106 F
(Continued)

FOREIGN PATENT DOCUMENTS

JP    2000-225935 A    8/2000
JP    2006-35967 A    2/2006
(Continued)

*Primary Examiner* — Christopher P Schwartz
(74) *Attorney, Agent, or Firm* — Birch, Stewart, Kolasch & Birch, LLP

(57) ABSTRACT

An electric brake device has at least three control units: a first diagonal wheel control unit that controls a front-left wheel brake mechanism and a rear-right wheel brake mechanism which are positioned diagonally; a second diagonal wheel control unit that controls a front-right wheel brake mechanism and a rear-left wheel brake mechanism which are positioned diagonally; and a front wheel control unit that controls a front-left wheel brake mechanism and a front-right wheel brake mechanism. Each of the brake mechanisms has a friction-receiving member that rotates together with the wheel; and a friction-applying member that moves while being powered by an electric actuator, and obtains the braking force by pressing the friction-applying member against the friction-receiving member.

14 Claims, 6 Drawing Sheets

(51) Int. Cl.
  *B60T 1/06* (2006.01)
  *B60T 13/74* (2006.01)
  *F16D 65/18* (2006.01)
  *F16D 65/22* (2006.01)
  *B60T 7/04* (2006.01)
  *B60T 7/10* (2006.01)
  *B60T 8/1755* (2006.01)
  *B60T 17/22* (2006.01)
  *F16D 121/24* (2012.01)
  *B60T 8/32* (2006.01)
  *B60T 8/34* (2006.01)

(52) U.S. Cl.
  CPC ............ *B60T 7/107* (2013.01); *B60T 8/1755* (2013.01); *B60T 13/741* (2013.01); *B60T 17/221* (2013.01); *F16D 65/18* (2013.01); *F16D 65/183* (2013.01); *F16D 65/22* (2013.01); *B60T 8/321* (2013.01); *B60T 8/3255* (2013.01); *B60T 8/343* (2013.01); *B60T 2270/402* (2013.01); *B60T 2270/414* (2013.01); *F16D 2121/24* (2013.01)

(58) Field of Classification Search
  USPC ......... 303/3, 7, 15, 20, 186–189; 701/70–72
  See application file for complete search history.

(56) References Cited

U.S. PATENT DOCUMENTS

| | | | | |
|---|---|---|---|---|
| 5,902,019 A * | 5/1999 | Maron | ............... | B60T 7/042 303/113.4 |
| 5,961,190 A * | 10/1999 | Brandmeier | ............ | B60T 7/042 188/159 |
| 6,059,379 A * | 5/2000 | Deml | ............... | B60T 8/321 188/1.11 E |
| 6,158,822 A * | 12/2000 | Shirai | ............... | B60T 13/74 188/1.11 L |
| 6,299,261 B1 * | 10/2001 | Weiberle | ............... | B60T 8/885 303/122.04 |
| 6,749,269 B1 * | 6/2004 | Niwa | ............... | B60T 13/741 303/115.2 |
| 7,347,506 B2 * | 3/2008 | Eliasson | ............... | B60T 7/12 303/122.15 |
| 9,020,724 B2 * | 4/2015 | Bellego | ............... | B60T 13/74 303/20 |
| 2006/0022518 A1 | 2/2006 | Manaka et al. | | |
| 2008/0067020 A1 | 3/2008 | Barbosa et al. | | |
| 2009/0260929 A1 * | 10/2009 | Boyle | ............... | B60T 13/746 188/156 |
| 2010/0243388 A1 * | 9/2010 | Holzwarth | ............... | B60T 8/885 188/158 |
| 2011/0320099 A1 * | 12/2011 | Kim | ............... | B60T 8/885 701/70 |
| 2015/0323026 A1 | 11/2015 | Yasui et al. | | |

FOREIGN PATENT DOCUMENTS

| | | |
|---|---|---|
| JP | 2006-170241 A | 6/2006 |
| JP | 2008-69969 A | 3/2008 |
| JP | 2010-501411 A | 1/2010 |
| JP | 2010-195122 A | 9/2010 |
| JP | 2014-134215 A | 7/2014 |
| WO | WO 2008/074649 A1 | 6/2008 |

* cited by examiner

FIG.3
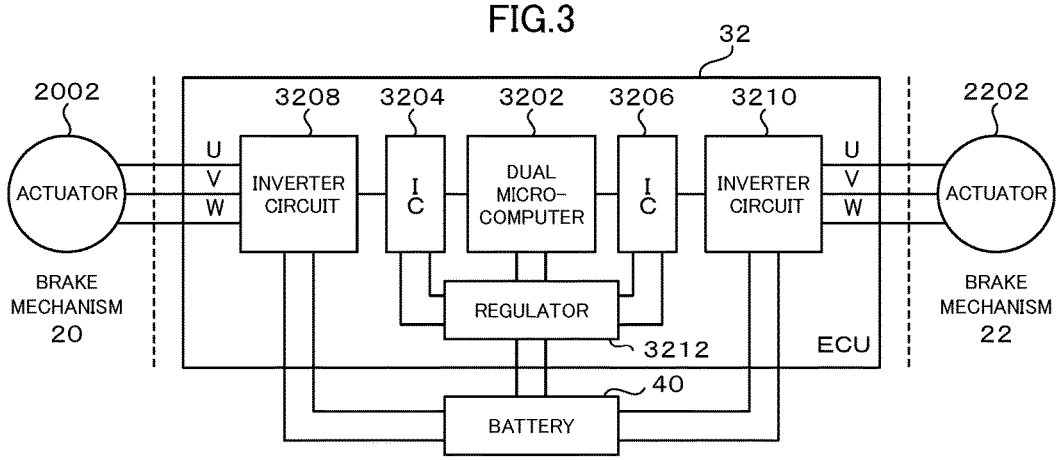
FIG.4A
FIG.4B
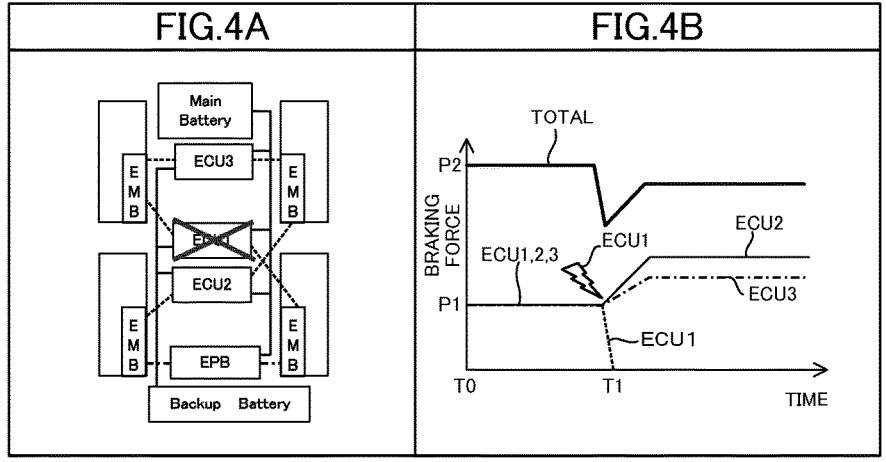
FIG.5A
FIG.5B
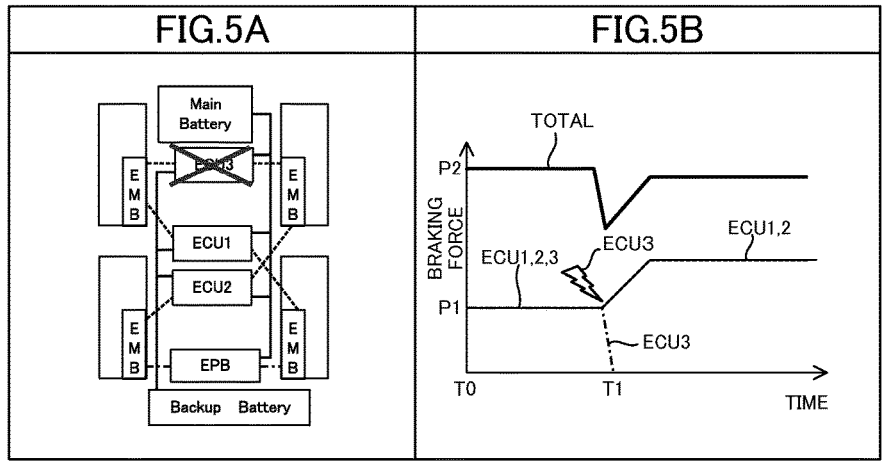

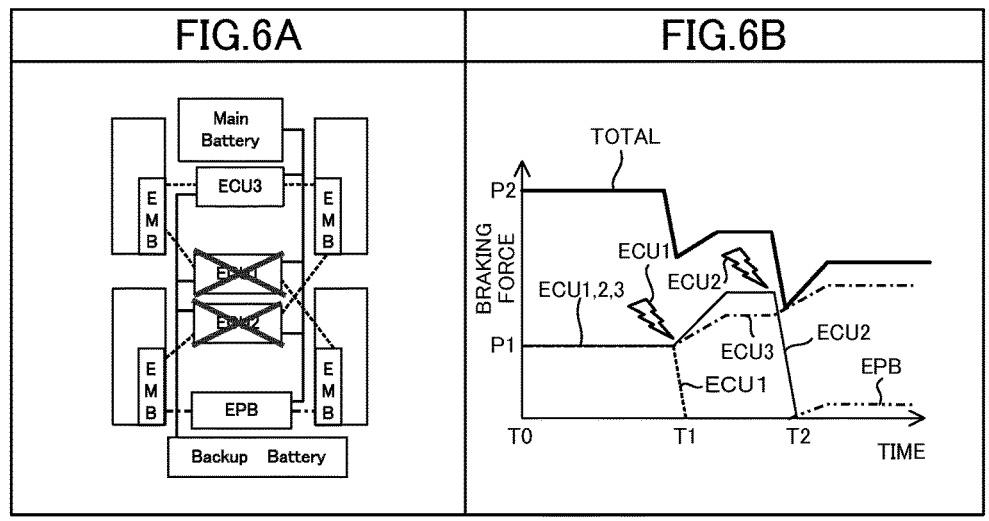
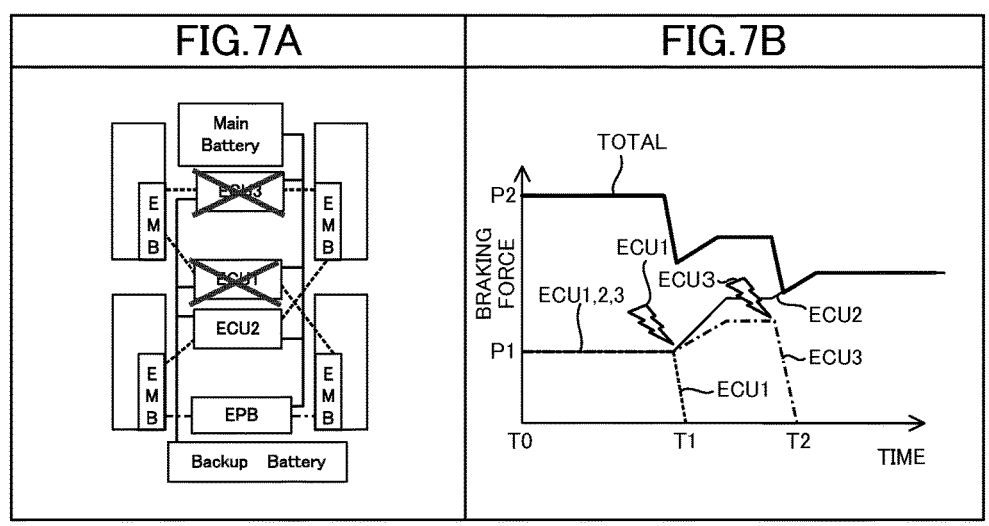

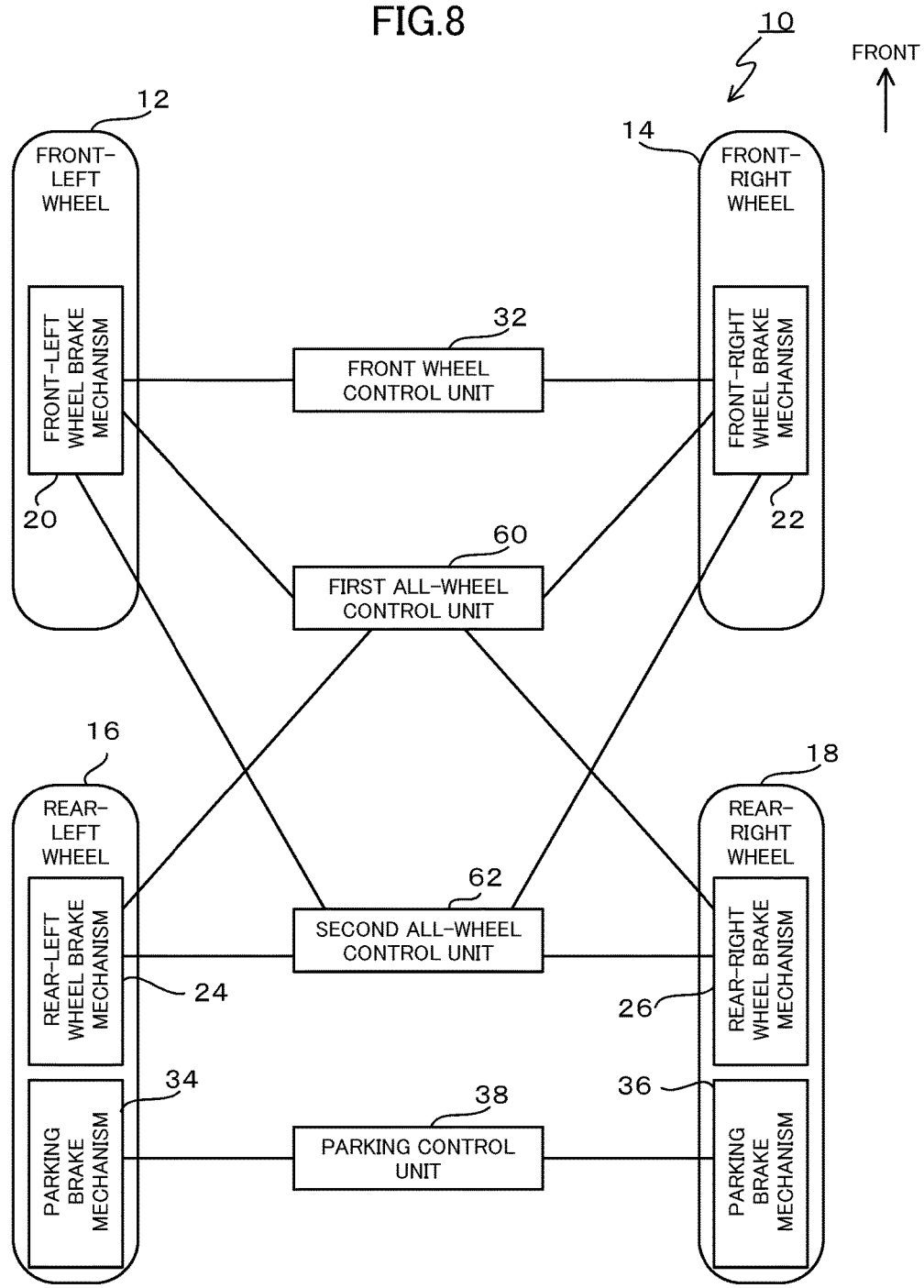

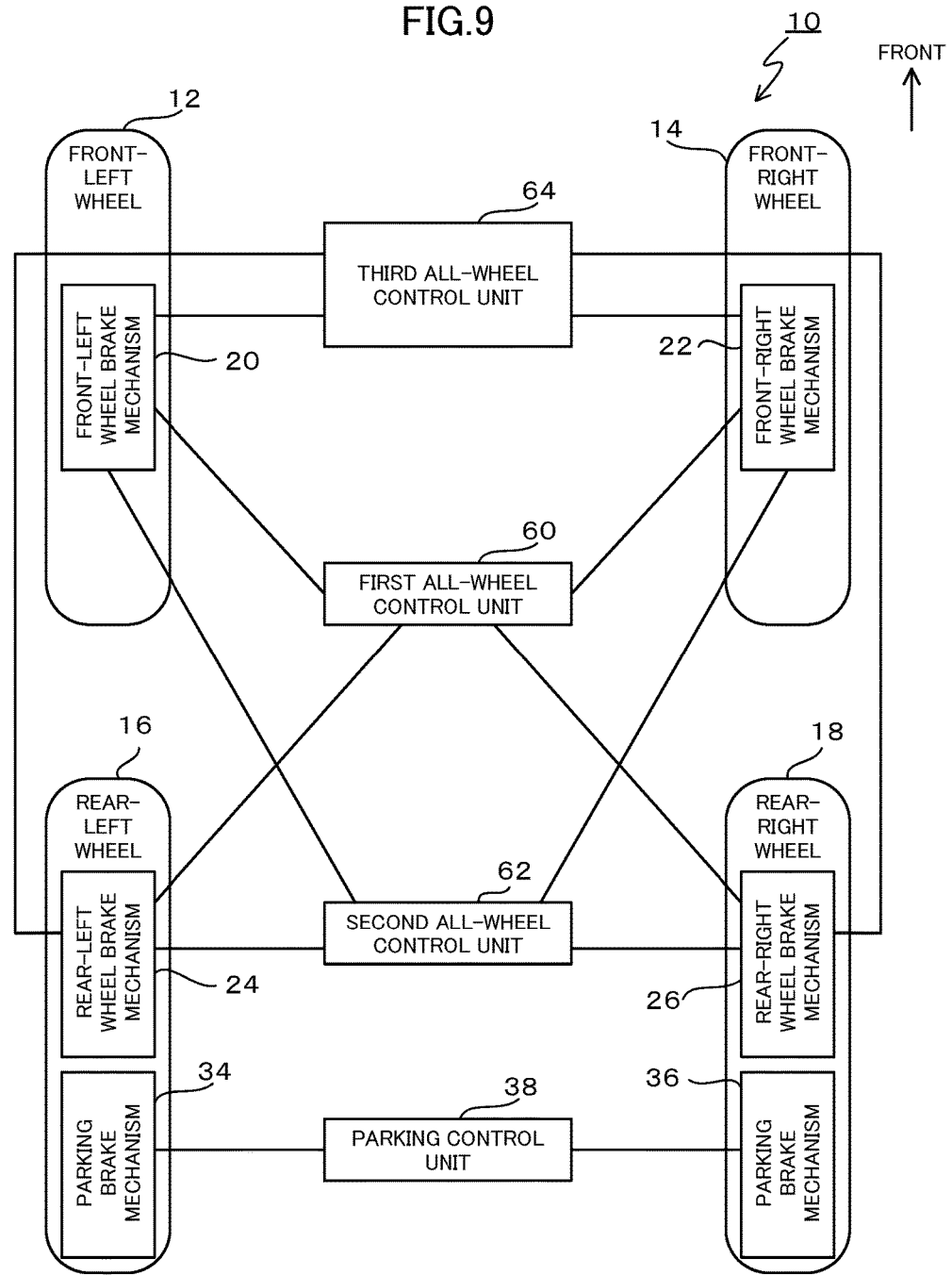

ELECTRIC BRAKE DEVICE

CROSS REFERENCE TO RELATED APPLICATION

This application is the National Phase of PCT International Application No. PCT/JP2016/063806, filed on May 10, 2016, which claims priority under 35 U.S.C. 119(a) to Patent Application No. 2015-133305, filed in Japan on Jul. 2, 2015, all of which are hereby expressly incorporated by reference into the present application.

TECHNICAL FIELD

This disclosure relates to an electric brake device having a friction-receiving member that rotates together with a wheel; and a friction-applying member that moves while being powered by an electric actuator, and obtains the braking force by pressing the friction-applying member against the friction-receiving member.

BACKGROUND ART

In recent years, as an alternative for the conventional hydraulic brake, there has been developed an electric brake device designed to obtain braking force by pressing a friction-applying member, such as brake pad, against a friction-receiving member such as brake disk, with the aid of an electric actuator.

The brake device is a critical mechanism of vehicles, and employs a redundant system by which the vehicles can safely stop even in case of brake failure.

For example, Patent Literature 1 below discloses an electrically controlled brake system that includes a brake for limiting rotation of wheels, a power unit, and a brake control unit for controlling the operational state of the brake by controlling electric energy supplied from the power unit; the brake system further includes, disposed between the power source and the brake control unit, a switching device that performs switching from a connected state to a disconnected state in association with braking operation of a brake operating member; the brake control unit includes a switchover unit that toggles between a coupled mode in which the operation of a mechanical brake that operates in association with motion of a brake operating member is coupled to the brake operating member, and a decoupled mode in which the operation is decoupled from the brake operating member, and a switchover unit control unit that performs, in case of failure of the electrically controlled brake system, switching from the decoupled mode to the coupled mode.

CITATION LIST

Patent Literature

Patent Literature 1: JP-A-2000-225935

Technical Problem

The above-described prior art is designed to obtain braking force, in case of failure of the electrically controlled brake system, by activating the mechanical brake. There is however a need for providing the mechanical brake in addition to an electrically controlled brake system, posing an issue of increasing the vehicle cost.

In addition, the above-described prior art has described that four control units are provided for four wheel braking mechanisms, but has not described a system that can control four wheel braking mechanisms with three or less control units, leaving a room for further improvement.

This disclosure, made in consideration of the above-described circumstances, is to improve convenience of the electric brake device.

Solution to Problem

In pursuit of achieving the above-described object, according to one embodiment, there is provided an electric brake device for a vehicle that has a first wheel pair composed of a first wheel and a second wheel arranged leaving a space in between in a width direction of vehicle, and a second wheel pair composed of a third wheel and a fourth wheel arranged leaving a space in between in the width direction, and arranged leaving a space from the first wheel pair in a length direction of vehicle, the device includes at least three control units: a first control unit that controls a first brake mechanism for braking a first wheel, and a third brake mechanism for braking a third wheel positioned diagonal to the first wheel; a second control unit that controls a second brake mechanism for braking the second wheel, and a fourth brake mechanism for braking the fourth wheel positioned diagonal to the second wheel; and a third control unit that controls the first brake mechanism and the second brake mechanism.

According to one embodiment, there is provided the electric brake device according one aspect of the invention, wherein, in case of failure of either one of the first control unit and the second control unit, the third control unit increases the braking force of either one of the first brake mechanism and the second brake mechanism controlled by such one control unit, while the other one of the first control unit and the second control unit increases the braking force of its target brake mechanism.

According to one embodiment, there is provided the electric brake device, wherein, in case of failure of the third control unit, the first control unit and the second control unit individually increase the braking force of their respective target front wheel brake mechanisms.

According to one embodiment, there is provided the electric brake device, wherein, in case of failure of the first control unit and the second control unit, the third control unit increases the braking force of each of the first brake mechanism and the second brake mechanism.

According to one embodiment, there is provided the electric brake device, further including a parking brake mechanism that applies braking force to each of the third wheel and the fourth wheel; and a parking control unit that controls the parking brake mechanisms, wherein, in case of failure of the first control unit and the second control unit, the parking control unit activates the parking brake mechanisms to generate braking force for the third wheel and the fourth wheel.

According to one embodiment, there is provided the electric brake device, wherein, in case of failure of either one of the first control unit and the second control unit, and also of the third control unit, the other one of the first control unit and the second control unit increases the braking force of the target brake mechanisms.

According to one embodiment, there is provided the electric brake device, wherein the first control unit additionally controls the second brake mechanism and the fourth brake mechanism, and the second control unit additionally controls the first brake mechanism and the third brake mechanism.

According to one embodiment, there is provided the electric brake device, wherein the third control unit additionally controls the third brake mechanism and the fourth brake mechanism.

According to one embodiment, there is provided such electric brake device, wherein each of the brake mechanisms includes a friction-receiving member that rotates together with the wheel; and a friction-applying member that moves while being powered by an electric actuator, and obtains the braking force by pressing the friction-applying member against the friction-receiving member.

According to one embodiment, there is provided such electric brake device, wherein each of the brake mechanisms includes a brake disk that rotates together with the wheel, and an electric caliper that has a brake pad movable between the pressing position and the non-pressing position relative to the brake disk by aid of the electric actuator.

According to one embodiment, there is provided such electric brake device, wherein the third brake mechanism and the fourth brake mechanism also function as the parking brake mechanism, and the parking control unit activates the parking brake by moving the brake pads of the third brake mechanism and the fourth brake mechanism to the pressing position relative to the brake disk.

According to one embodiment, there is provided such electric brake device, wherein the parking brake mechanism includes a brake drum that is provided in a hat positioned at the center of the brake disk of each of the third brake mechanism and the fourth brake mechanism, and is rotatable together with the wheel; and a brake shoe provided in each of the brake drums and movable between the pressing position and the non-pressing position relative to each brake drum by aid of an electric actuator for parking, and the parking control unit activates the parking brake by moving the brake shoe of the parking brake mechanism to the pressing position relative to the brake drum.

According to one embodiment, there is provided such electric brake device, wherein the parking brake mechanism includes a brake drum that is provided in a hat positioned at the center of the brake disk of each of the third brake mechanism and the fourth brake mechanism, and is rotatable together with the wheel; and a brake shoe provided in each of the brake drums and movable between the pressing position and the non-pressing position relative to each brake drum by aid of a linear motion electric actuator, and the parking control unit activates the parking brake by moving the brake shoe of the parking brake mechanism to the pressing position relative to the brake drum.

According to one embodiment, there is provided such electric brake device, wherein each of the brake mechanisms is connected to a main battery and a backup battery that serve as power sources for controlling and activating the brake mechanisms, and, in case of main battery failure, the power source for each brake mechanism is switched to the backup battery.

According to one embodiment, there is provided such electric brake device, wherein the first wheel is the front-left wheel, the second wheel is the front-right wheel, the third wheel is the rear-left wheel, and the fourth wheel is the rear-right wheel; the first brake mechanism is the front-left wheel brake mechanism, the second brake mechanism is the front-right wheel brake mechanism, the third brake mechanism is the rear-left wheel brake mechanism, and the fourth brake mechanism is the rear-right wheel brake mechanism; and the first control unit is a first diagonal wheel control unit, the second control unit is a second diagonal wheel control unit, and the third control unit is a front wheel control unit.

Advantageous Effects of Invention

According to one embodiment, four brake mechanism can be controlled by three control units, posing an advantage of reducing the quantity of parts for the electric brake device, and reducing the vehicle cost.

According to one embodiment, in case of failure of either one of the first control unit and the second control unit, the third control unit increases the braking force of either one of the first brake mechanism and the second brake mechanism controlled by such one control unit, while the other one of the first control unit and the second control unit increases the braking force of its target brake mechanism, so that the reduced braking force may be compensated, while suppressing the vehicle deflection caused by the control unit failure, and thereby the total braking force may be reserved.

According to one embodiment, in case of failure of the third control unit, the first control unit and the second control unit increase the braking force of the brake mechanisms placed under the control of the third control unit, posing an advantage of keeping the braking force of the brake mechanism designed to be controlled by the third control unit.

According to one embodiment, in case of failure of both of the first control unit and the second control unit, the third control unit increases the braking force of the target brake mechanisms, posing an advantage of keeping the braking force of the brake mechanism controlled by the third control unit.

According to one embodiment, in case of failure of both of the first control unit and the second control unit, and therefore the third wheel and the fourth wheel cannot work, the parking brake mechanisms is activated to produce braking force for the third wheel and the fourth wheel, so that a higher level of braking force may be obtained.

According to one embodiment, even if either the first control unit or the second control unit, and also the third control unit should go into failure, the diagonal wheels can remain brakable, posing an advantage of stabilizing the vehicle posture during braking.

According to one embodiment, the first control unit and the second control unit control the brake mechanisms of all of four wheels, so that redundancy against the control unit failure may be improved.

According to one embodiment, all of three control units control the brake mechanisms of all of four wheels, posing an advantage of further improving the redundancy against control unit failure.

According to one embodiment, each of the brake mechanisms obtains the braking force by pressing, with the aid of the actuator, the friction-applying member against the friction-receiving member that rotates together with the wheel, posing an advantage of improving responsiveness to the brake operation as compared with the conventional hydraulic brake, and enabling various modes of brake operation adopted to the vehicle conditions.

According to one embodiment, a disk brake system with a high heat radiation performance is built by employing a brake disk as the friction-receiving member, and a brake pad as the friction-applying member, posing an advantage of improving durability of the brake mechanism.

According to one embodiment, the third brake mechanism and the fourth brake mechanism also function as the parking brake mechanism, posing an advantage of reducing vehicle weight and simplifying vehicle configuration, as compared with the case where a dedicated parking brake mechanism is provided.

According to one embodiment, the parking brake mechanism is composed by providing a drum brake system at the center of the brake disk, posing an advantage of relieving the load of the individual brake mechanisms, as compared with the case where the third brake mechanism and the fourth brake mechanism also function as the parking brake mechanism.

According to one embodiment, the parking brake mechanism is configured by providing an additional brake system for the parking brake at the center of the brake disk, posing an advantage of relieving the load of the individual brake mechanisms, as compared with the case where the third brake mechanism and the fourth brake mechanism also function as the parking brake mechanism.

According to one embodiment, there are provided two batteries for supplying power to each brake mechanism, making it possible to allowing a sub-battery to activate the brake mechanism even in case of failure of the main battery, posing an advantage of improving redundancy of the brake mechanism.

According to one embodiment, two control units are allocated to the left and right brake mechanism for the front wheels, and a single control unit is allocated to the left and right brake mechanisms for the rear wheels, so that even if one control unit should go into failure, the front wheel brake mechanisms remain controllable by the residual control unit, posing an advantage of enhancing redundancy of the front wheel brake generally distributed with larger braking force than the rear wheels.

BRIEF DESCRIPTION OF DRAWINGS

FIG. 3 is an explanatory drawing illustrating an exemplary schematic configuration of a control unit.

FIG. 4 is an explanatory drawing illustrating changes in braking force in case of control unit failure.

FIG. 5 is an explanatory drawing illustrating changes in braking force in case of control unit failure.

FIG. 6 is an explanatory drawing illustrating changes in braking force in case of control unit failure.

FIG. 7 is an explanatory drawing illustrating changes in braking force in case of control unit failure.

FIG. 8 is an explanatory drawing illustrating another configuration of the electric brake device 10.

FIG. 9 is an explanatory drawing illustrating another configuration of the electric brake device 10.

DESCRIPTION OF EMBODIMENTS

Preferred embodiments of the electric brake device of this invention will be detailed below, referring to the attached drawings.

Figure 1:
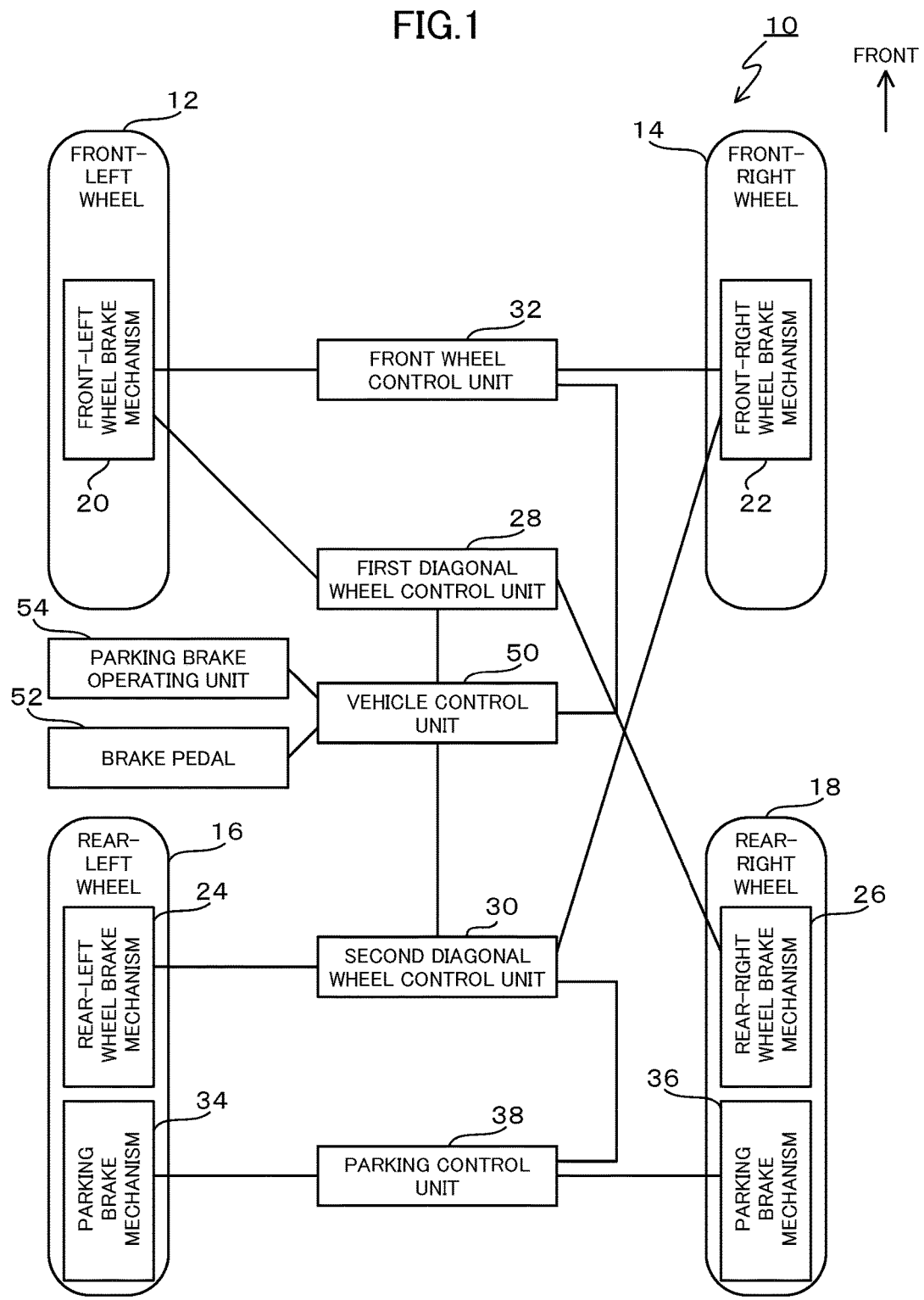
FIG. 1 is an explanatory drawing illustrating a configuration of an electric brake device 10 according to an embodiment.

FIG. 1 is an explanatory drawing illustrating a configuration of an electric brake device 10 according to an embodiment.

The electric brake device 10 is configured to contain front left, front right, rear left, and rear right wheels 12, 14, 16, 18; brake mechanisms 20, 22, 24 and 26, and 34 and 36 respectively provided to the wheels; control units 28, 30, 32, 38, 50; and operating units 52, 54.

Note that, in addition to the configuration illustrated in FIG. 1, the electric brake device 10 also has a main battery 40 and a backup battery 42 (see FIG. 2), but not shown in FIG. 1.

In more detail, the wheels 12, 14, 16, 18 are the front-left wheel 12, the front-right wheel 14, the rear-left wheel 16, and the rear-right wheel 18. There are provided the front-left wheel brake mechanism 20 to the front-left wheel 12; the front-right wheel brake mechanism 22 to the front-right wheel 14; the rear-left wheel brake mechanism 24 to the rear-left wheel 16; and the rear-right wheel brake mechanism 26 to the rear-right wheel 18, respectively, making it possible to brake the respective wheels.

The individual brake mechanisms 20, 22, 24, 26 configure service brakes, and are respectively provided with control units 28, 30, 32.

Among them, the front-left wheel brake mechanism 20 is controlled by the first diagonal wheel control unit 28 and the front wheel control unit 32; the front-right wheel brake mechanism 22 is controlled by the second diagonal wheel control unit 30 and the front wheel control unit 32; the rear-left wheel brake mechanism 24 is controlled by the second diagonal wheel control unit 30; and the rear-right wheel brake mechanism 26 is controlled by the first diagonal wheel control unit 28, respectively.

In other words, the first diagonal wheel control unit 28 controls the front-left wheel brake mechanism 20 and the rear-right wheel brake mechanism 26. The second diagonal wheel control unit 30 controls the front-right wheel brake mechanism 22 and the rear-left wheel brake mechanism 24. The front wheel control unit 32 controls the front-left wheel brake mechanism 20 and the front-right wheel brake mechanism 22.

The first diagonal wheel control unit 28 and the second diagonal wheel control unit 30 individually control the diagonally positioned wheel. The "diagonally positioned wheel" means a wheel at a position opposite to a certain wheel both in the front-rear direction and crosswise direction.

The parking control unit 38 controls the parking brake mechanisms 34, 36.

The individual control units 28, 30, 32, 38 are connected to the vehicle control unit 50 that takes part in main control of the vehicle.

The vehicle control unit 50 is connected to a brake pedal (service brake operating unit) 52 and a parking brake operating unit 54, and outputs, when the brake pedal 52 or the parking brake operating unit 54 is operated, a control signal that directs the individual control units 28, 30, 32, 38 to activate the brake.

The vehicle control unit 50 also monitors the operating status of the individual control units 28, 30, 32, 38, and outputs, when any of the control units 28, 30, 32, 38 should go into failure, a control signal that notifies other control units of the failure.

Note that, in place of notifying the failure of the control units 28, 30, 32, 38 by way of the vehicle control unit 50, the individual control units 28, 30, 32, 38 may be connected directly so as to allow them to monitor each other.

Each of the brake mechanisms 20, 22, 24, 26 is an electric brake mechanism (electro-mechanical brake: EMB) that has a friction-receiving member that rotates together with a wheel, and a friction-applying member that moves while being powered by an electric actuator, and obtains the braking force by pressing the friction-applying member against the friction-receiving member.

In more detail, each of the brake mechanisms 20, 22, 24, 26 has a brake disk (friction-receiving member) that rotates together with the wheel, and an electric caliper that has a brake pad movable between the pressing position and the non-pressing position relative to the brake disk by aid of the electric actuator.

In the normal state (non-braking state), the brake pad is positioned at the non-pressing position away from the brake disk. When braking, the control units 28, 30, 32 activate the electric actuator to move the brake pad to the pressing position where the pad comes into contact with the brake disk, thereby kinetic energy of the wheels is converted into thermal energy, and the vehicle is slowed down to a desired speed.

FIG. 3 is an explanatory drawing illustrating an exemplary schematic configuration of the control unit.

In this embodiment, each of the control units 28, 30, 32 controls two brake mechanisms, and all of them have the same configuration. FIG. 3 illustrates the front wheel control unit 32.

The front wheel control unit 32 is configured to contain a dual microcomputer 3202, two integrated circuits (ICs) 3204, 3206, two bridge (inverter) circuits 3208, 3210, and a power source regulator 3212. The power source regulator 3212 and the bridge circuits 3208, 3210 are individually connected to the battery 40.

The dual microcomputer 3202 is connected to the vehicle control unit 50 (not illustrated in FIG. 3), and, when a brake activation instruction was issued from the vehicle control unit 50, activates the bridge circuits 3208, 3210 to convert electric power of the battery 40 into three-phase AC power, and supplies the power to the electric actuators 2002, 2202 of the brake mechanisms (the front-left wheel brake mechanism 20 and front-right wheel brake mechanism 22 in FIG. 3) to thereby activate the electric actuators 2002, 2202. In other words, the front wheel control unit 32 contains power source circuits for the front-left wheel brake mechanism 20 and the front-right wheel brake mechanism 22.

Since operations of the bridge circuits 3208, 3210 are controllable independently, so that the individual electric actuators 2002, 2202 (the front-left wheel brake mechanism 20 and the front-right wheel brake mechanism 22) may be put into operation independently.

As described above, the front-left wheel brake mechanism 20 for example is controlled by the front wheel control unit 32 and the first diagonal wheel control unit 28. In the normal state, the front wheel control unit 32 and the first diagonal wheel control unit 28 go halves in the power necessary for the front-left wheel brake mechanism.

Since the electric brake mechanism controls operations of the brake mechanisms using electric signals, so that the operations of the brake mechanism may be controlled finely depending on situations, thus making it no more necessary to use hydraulic piping, and making it possible to considerably reduce the vehicle weight.

Referring now back to FIG. 1, the rear-left wheel 16 and the rear-right wheel 18 are further provided with the parking brake mechanisms 34, 36, respectively. The parking brake mechanisms 34, 36 are mainly used for preventing parked vehicles from moving.

The parking brake mechanisms 34, 36 are controlled by the parking control unit 38.

In this embodiment, each of the parking brake mechanisms 34, 36 is an electric parking brake (EPB), and may be configured in various ways.

Figure 2:
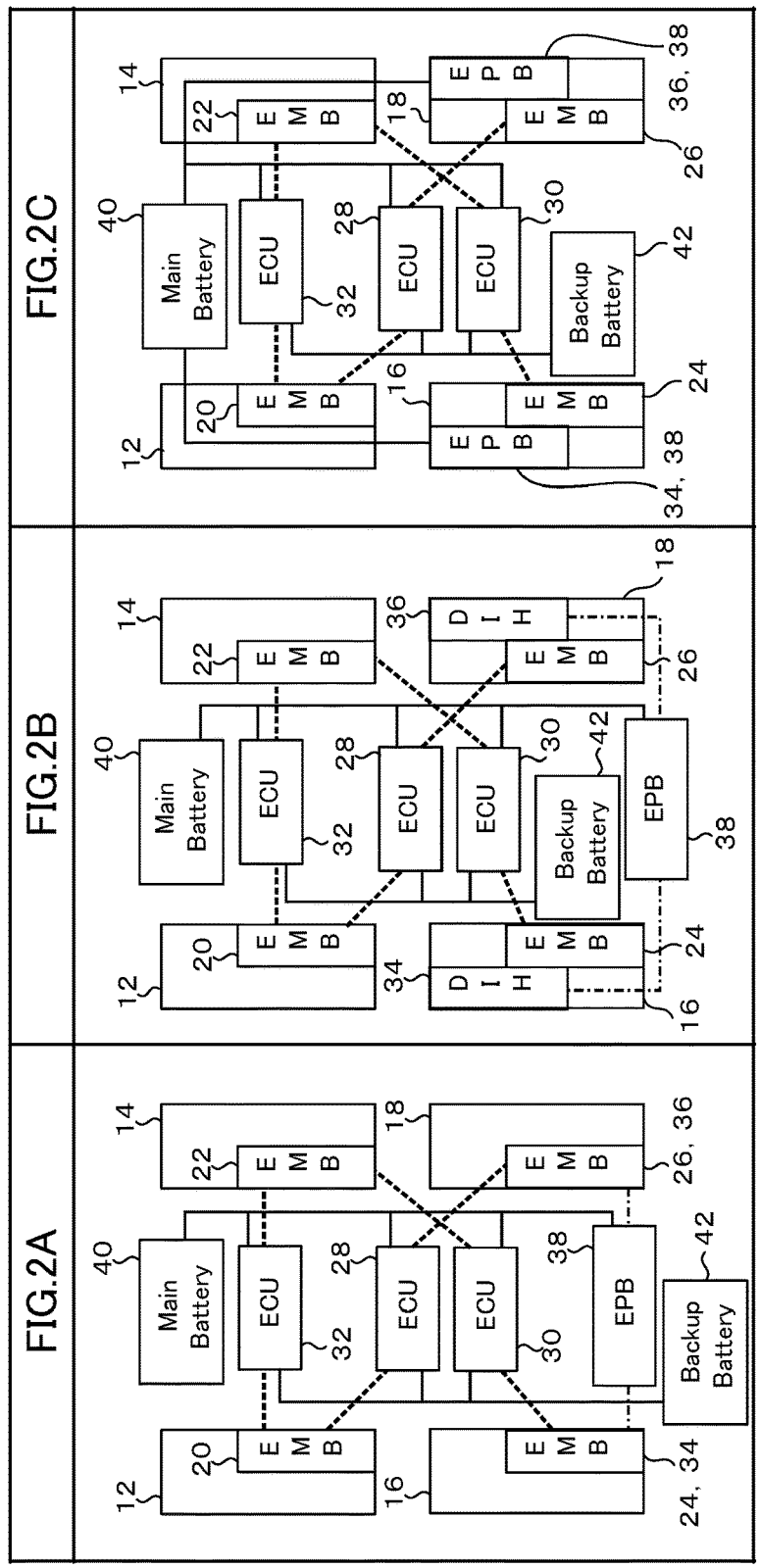
FIG. 2 is an explanatory drawing illustrating an exemplary configuration of a parking brake in the electric brake device 10.

FIG. 2 is an explanatory drawing illustrating an exemplary configuration of the parking brake in the electric brake device 10.

In FIG. 2, EMB 20 corresponds to the front-left wheel brake mechanism 20, EMB 22 to the front-right wheel brake mechanism 22, EMB 24 to the rear-left wheel brake mechanism 24, and EMB 26 to the rear-right wheel brake mechanism 26.

An ECU 28 corresponds to the first diagonal wheel control unit 28, an ECU 30 to the second diagonal wheel control unit 30, and an ECU 32 to the front wheel control unit 32.

EPB 38 corresponds to the parking control unit 38.

In the design illustrated in FIG. 2A, the rear-left wheel brake mechanism 24 and the rear-right wheel brake mechanism 26 also function as the parking brake mechanisms 34, 36, respectively.

More specifically, when using the parking brake, the parking control unit 38 activates the electric actuators of the rear-left wheel brake mechanism 24 and the rear-right wheel brake mechanism 26, the brake pads then move to the pressing position relative to the brake disk, to thereby apply braking force to the rear-left/right wheels 16, 18.

With such configuration, a brake mechanism solely for parking is no more necessary, and the vehicle weight may be reduced.

FIG. 2B illustrates an exemplary configuration of the parking brake mechanisms 34, 36 based on the drum-in-hat (DIH) system, in which a brake drum is disposed in the brake disk of the rear-left wheel brake mechanism 24 and the rear-right wheel brake mechanism 26.

More specifically, the parking brake mechanisms 34, 36 have brake drums respectively disposed in the hats positioned at the center of the brake pads of the rear-left wheel brake mechanism 24 and the rear-right wheel brake mechanism 26, and rotate together with the wheels; and brake shoes provided inside the individual brake drums, and movable between the pressing position and the non-pressing position relative to the brake drums while being powered by the electric actuators for parking.

In the normal state (non-braking state for parking), each brake shoe is energized by a spring towards the inner circumference of the brake drum, and is kept at the non-pressing position away from the brake drum. To the brake shoe, there is also attached a brake shoe lever whose one end is attached to the brake shoe in a swingable manner, and whose other end has a wire attached thereto.

When the wire is pulled (wound) by the electric actuator for parking, the brake shoe lever swings, the brake shoe moves towards the outer circumference of the brake drum against the energizing force of the spring, and positions itself at the pressing position relative to the brake drum.

As described above, when operating the parking brake, the parking control unit 38 activates the electric actuator for parking, moves the brake shoes of the parking brake mechanisms 34, 36 to the pressing position relative to the brake drum, to thereby apply the braking force to the rear-left/right wheels 16, 18.

FIG. 2C illustrates an exemplary configuration of the brake drum-type electric parking brake mechanisms 34, 36 built in the brake disks of the rear-left wheel brake mechanism 24 and the rear-right wheel brake mechanism 26.

More specifically, the parking brake mechanisms 34, 36 have the brake drums that are provided in the hat positioned at the center of the brake disks of the rear-left wheel brake mechanism 24 and the rear-right wheel brake mechanism 26, and rotate together with the wheels; and the brake shoes provided inside the individual brake drums, and is movable between the pressing position and the non-pressing position relative to the brake drum while being powered by the electric actuator for parking. The parking control unit 38 is configured integrally with each of the parking brake mechanisms 34, 36.

In the normal state (non-braking state for parking), the brake shoe is energized towards the inner circumference of the brake drum, and is kept at the non-pressing position away from the brake drum. Between one end of the brake shoe, a motor with a linear motion mechanism is attached.

When the motor of the drum-type parking rotates, the brake shoe is pushed on one end while mediated by a linear motion mechanism. When the brake shoe is pressed, it moves towards the outer circumference of the brake drum, and comes into the pressing position relative to the brake drum.

In this way, when operating the parking brake, the parking control unit 38 activates the electric actuator for parking so as to move the brake shoes of the parking brake mechanisms 34, 36 to the pressing position relative to the brake drum, thereby the braking force is applied to the rear-left/right wheels 16, 18.

Next, a control process in case of failure of the electric brake device 10 will be explained.

In general, if three out of the four wheels 12, 14, 16, 18 become unbrakable (only one wheel remains brakable), the braking will be very likely to off-balance the vehicle.

The electric brake device 10 uses three control units 28, 30, 32 to control four brake mechanisms 20, 22, 24, 26 provided to four wheels 12, 14, 16, 18, and in case of failure of two of these control units, three wheels will become uncontrollable, and thereby the vehicle may be off-balanced.

For this reason, in case of braking malfunction of any of the front-left wheel, the front-right wheel, the rear-left wheel and the rear-right wheel, and even in case of failure of any one of, or two control units out of the three control units 28, 30, 32, the electric brake device 10 is designed to leave at least two wheels brakable, so as to keep the steering performance of the vehicle, and so as to reserve a level of braking force necessary to stop the vehicle.

Note that, in this embodiment, failure of the control units 28, 30, 32 means the state that they cannot activate the brake mechanisms 20, 22, 24, 26, and is exemplified by failure of the power source circuit, and signal wire breakage.

Besides those described above, also failure of the brake mechanisms 20, 22, 24, 26, such as failure of the electric actuator and wear of the brake pad, may result in malfunction in wheel braking. Control policies described below will be adoptable for these cases.

FIG. 4 to FIG. 7 are explanatory drawings illustrating changes in the braking force in case of failure of the control unit.

Note that, in FIG. 4 to FIG. 7, ECU1 corresponds to the first diagonal wheel control unit 28, ECU2 to the second diagonal wheel control unit 30, ECU3 to the front wheel control unit 32, and EPB to the parking control unit 38, respectively.

In the description below, the phrase stating that "the control unit increases (or reduces) the braking force of the brake mechanism" discusses, for example, the magnitude of control exerted from the subject control unit to the brake mechanism, and does not always identify the braking force of the brake mechanism as a whole.

More specifically, for the case where the brake mechanism is controlled by a plurality of control units, even increase in the braking force given by one control unit will not always increase the braking force of the brake mechanism as a whole, typically due to failure of other control units.

First, an exemplary case where one of the diagonal wheel control units (in FIG. 4, the first diagonal wheel control unit 28) went into failure, illustrated in FIG. 4A, will be explained.

As illustrated in FIG. 4B, at the initial time T0 when the failure not yet occurred, the first diagonal wheel control unit 28, the second diagonal wheel control unit 30, and the front wheel control unit 32 (ECU1, 2, 3) respectively operate the target brake mechanisms 20, 22, 24, 26, so as to generate a predetermined braking force P1.

Since the front-left wheel brake mechanism 20 is powered from the first diagonal wheel control unit 28 and the front wheel control unit 32, and the front-right wheel brake mechanism 22 is powered from the second diagonal wheel control unit 30 and front wheel control unit 32, so that they generate larger braking force than the left and right brake mechanisms 24, 26 for rear wheels will do.

The braking force generated by the three control units 28, 30, 32 totals P2.

When the first diagonal wheel control unit 28 (ECU1) went into failure at time T1, the front-left wheel brake mechanism 20 and the rear-right wheel brake mechanism 26 can no more be powered. Thus the braking force of the front-left wheel brake mechanism 20 is halved, and the braking force of the rear-right wheel brake mechanism 26 falls to zero.

In this case, the second diagonal wheel control unit 30 (ECU2) increases the power supply to the front-right wheel brake mechanism 22 and the rear-left wheel brake mechanism 24, to thereby increase the braking power of the front-right wheel brake mechanism 22 and the rear-left wheel brake mechanism 24.

The front wheel control unit 32 increases power to be supplied to the front-left wheel brake mechanism 20 placed under the control of the first diagonal wheel control unit 28, to thereby increase the braking force of the front-left wheel brake mechanism 20.

This is because the front wheels are generally designed to have larger braking force, so that braking only on the diagonal wheel will slightly drift the vehicle leftward or rightward.

For example, given that allocation of the braking force before failure is 35% for the front-left wheel 12, 35% for the front-right wheel 14, 15% for the rear-left wheel 16, and 15% for the rear-right wheel 18, and assuming now that the first diagonal wheel control unit 28 went into failure, and that braking will be given only to the front-right wheel 14 and the rear-left wheel 16, the front-right wheel will have 35% of the braking force, and the rear-left wheel will have 15% of the braking force. Such braking force larger on the right makes the vehicle drift rightward.

Now by compensating the braking force of the front-left wheel brake mechanism 20 through the front wheel control unit 32, the degree of deflection of vehicle will be reduced. For example, if the allocation of braking force could be 35% for the front-right, 20% for the front-left, and 15% for the rear-left, the braking force is balanced well between left and right, and thereby the deflection of vehicle will be reduced.

In this way, the braking force having been reduced due to failure of the first diagonal wheel control unit 28 may be compensated, and the total braking force may be reserved.

Note that, in case of failure of the second diagonal wheel control unit 30, it suffices to replace, in the description above, the "first diagonal wheel control unit 28" with the "second diagonal wheel control unit 30", and to exchange the target brake mechanisms.

In other words, in case of failure of either one of the first diagonal wheel control unit 28 and the second diagonal wheel control unit 30, the front wheel control unit 32 increases the braking force of the front wheel brake mechanism controlled by one diagonal wheel control unit, and also the other one of the first diagonal wheel control unit 28 and the second diagonal wheel control unit 30 increases the braking force of the target brake mechanisms.

Next, an exemplary case where the front wheel control unit 32 went into failure, illustrated in FIG. 5A, will be explained.

As illustrated in FIG. 5B, at the initial time T0 when the failure not yet occurs, the first diagonal wheel control unit 28, the second diagonal wheel control unit 30, and the front wheel control unit 32 (ECU1, 2, 3) respectively operate the target brake mechanisms 20, 22, 24, 26, so as to generate a predetermined braking force P1.

The braking force of the three control units 28, 30, 32 totals P2.

If the front wheel control unit 32 (ECU3) went into failure at time T1, the front-left wheel brake mechanism 20 and the front-right wheel brake mechanism 22 can no more be powered. Thus the braking forces of the front-left wheel brake mechanism 20 and the front-right wheel brake mechanism 22 are halved.

In this case, the first diagonal wheel control unit 28 (ECU1) increases the power supply to the front-left wheel brake mechanism 20, the second diagonal wheel control unit 30 (ECU2) increases the power supply to the front-right wheel brake mechanism 22, to thereby increase the braking force of the front-left wheel brake mechanism 20 and the front-right wheel brake mechanism 22.

In this way, the braking force having been reduced due to failure of the front wheel control unit 32 may be compensated.

In other words, in case of failure of the front wheel control unit 32, the first diagonal wheel control unit 28 and the second diagonal wheel control unit 30 respectively increase the braking force of the target brake mechanisms 20 and 22 for front wheels.

Next, an exemplary case where both diagonal wheel control units (the first diagonal wheel control unit 28 and the second diagonal wheel control unit 30) successively went into failure, illustrated in FIG. 6A, will be explained.

Referring to FIG. 6B, an exemplary case where the first diagonal wheel control unit 28 went into failure first, and the second diagonal wheel control unit 30 went into failure next, will be explained.

As illustrated in FIG. 6B, at the initial time T0 when the failures not yet occur, the first diagonal wheel control unit 28, the second diagonal wheel control unit 30, and the front wheel control unit 32 (ECU1, 2, 3) respectively operate the target brake mechanisms 20, 22, 24, 26 so as to produce a predetermined braking force P1.

The braking force generated by the three control units 28, 30, 32 totals P2.

When the first diagonal wheel control unit 28 (ECU1) went into failure at time T1, the front-left wheel brake mechanism 20 and the rear-right wheel brake mechanism 26 can no more be powered. Thus the braking power of the front-left wheel brake mechanism 20 is now halved, and braking power of the rear-right wheel brake mechanism 26 falls down to zero.

In this case, the second diagonal wheel control unit 30 (ECU2) increases the power supply to the front-right wheel brake mechanism 22 and the rear-left wheel brake mechanism 24, to thereby increase the braking power of the front-right wheel brake mechanism 22 and the rear-left wheel brake mechanism 24.

The front wheel control unit 32 increases the power to be supplied to the front-left wheel brake mechanism 20 placed under the control of the first diagonal wheel control unit 28, to thereby increase the braking force of the front-left wheel brake mechanism 20.

Next, when the second diagonal wheel control unit 30 went into failure at time T2, the front-right wheel brake mechanism 22 and the rear-left wheel brake mechanism 24 can no more be powered. Thus the braking force of the front-right wheel brake mechanism 22 is now halved, and the braking force of the rear-left wheel brake mechanism 24 falls to zero. The vehicle is now in the no-braking state with respect to the rear left/right wheels.

In this case, the front wheel control unit 32 increases the power supply to the front-right wheel brake mechanism 22 placed under the control of the second diagonal wheel control unit 30.

The parking control unit 38 activates the parking brake mechanisms 34, 36 to generate braking power for the rear wheels 16, 18.

Although the braking force of the parking brake mechanisms 34, 36 is smaller than those of the rear-left wheel brake mechanism 24 and the rear-right wheel brake mechanism 26 that are service brakes, it can provide a certain level of braking force to the rear wheels 16, 18, and thereby a higher level of braking force may be obtained.

In other words, in case of failure of the first diagonal wheel control unit 28 and the second diagonal wheel control unit 30, the front wheel control unit 32 increases braking force of both of the front-left wheel brake mechanism 20 and the front-right wheel brake mechanism 22. The parking control unit 38 activates the parking brake mechanisms 34, 36 to generate the braking force for the rear-left wheel 16 and the rear-right wheel 18.

Note that, if the failure of the second diagonal wheel control unit 30 comes first, and the failure of the first diagonal wheel control unit 28 follows, it suffices to replace, in the description above, the "first diagonal wheel control unit 28" with the "second diagonal wheel control unit 30".

Next, an exemplary case where either one of the diagonal wheel control units (the first diagonal wheel control unit 28 or the second diagonal wheel control unit 30), and the front wheel control unit 32 successively went into failure, illustrated in FIG. 7A, will be explained.

Referring to FIG. 7B, an exemplary case where the first diagonal wheel control unit 28 went into failure first, and the front wheel control unit 32 went into failure next, will be explained.

As illustrated in FIG. 7B, at the initial time T0 when the failures not yet occur, the first diagonal wheel control unit 28, the second diagonal wheel control unit 30, and the front wheel control unit 32 (ECU1, 2, 3) respectively operate the target brake mechanisms 20, 22, 24, 26 so as to generate a predetermined braking force.

The braking force generated by the three control units 28, 30, 32 totals P2.

When the first diagonal wheel control unit 28 (ECU1) went into failure, the front-left wheel brake mechanism 20 and the rear-right wheel brake mechanism 26 can no more be powered. The front-left wheel brake mechanism 20 is halved, and the braking force of the rear-right wheel brake mechanism 26 falls to zero.

In this case, the second diagonal wheel control unit 30 (ECU2) increases the power supply to the front-right wheel brake mechanism 22 and the rear-left wheel brake mechanism 24, to thereby increase the braking force of the front-right wheel brake mechanism 22 and the rear-left wheel brake mechanism 24.

The front wheel control unit 32 increases the power supply to the front-left wheel brake mechanism 20 placed under the control of the first diagonal wheel control unit 28, to thereby increase the braking force of the front-left wheel brake mechanism 20.

Next, when the front wheel control unit 32 went into failure, the front-left wheel brake mechanism 20 and the front-right wheel brake mechanism 22 can no more be powered. Thus the braking force of the front-left wheel brake mechanism 20 falls to zero, and the braking force of the front-right wheel brake mechanism 22 is halved.

In this case, the second diagonal wheel control unit 30 increases the braking force of the target front-right wheel brake mechanism 22 and the rear-left wheel brake mechanism 24.

In short, even only with the brake mechanism (front-right wheel brake mechanism 22 and the rear-left wheel brake mechanism 24) positioned diagonally on the vehicle, an appropriate distribution of braking force enables braking while stabilizing the vehicle posture.

In other words, in case of failure of either one of the first diagonal wheel control unit 28 and the second diagonal wheel control unit 30, and also of the front wheel control unit 32, the other one of the first diagonal wheel control unit 28 and second diagonal wheel control unit 30 increases the braking force of the target brake mechanisms.

Now, an exemplary case where the front wheel control unit 32 went into failure first, and one of the diagonal wheel control units (the first diagonal wheel control unit 28 or the second diagonal wheel control unit 30) went into failure next, will be explained.

In this case, when the front wheel control unit 32 went into failures as illustrated in FIG. 5B, the first diagonal wheel control unit 28 and the second diagonal wheel control unit 30 respectively increase braking force of the target brake mechanisms.

Thereafter, when one of the diagonal wheel control units went into failure, the non-defective (other) diagonal wheel control unit increases the braking force of the target diagonal brake mechanism to thereby brake the vehicle.

In short, different orders of failures finally result in the same state as shown in FIG. 7.

Other probable mode of failure is such that the front wheel control unit 32 and the parking control unit 38 go into failure. In this case, it suffices to increase the braking force of the front, rear, left and right brake mechanisms 20, 22, 24, 26 by using the first diagonal wheel control unit 28 and the second diagonal wheel control unit 30.

While the first diagonal wheel control unit 28 and the second diagonal wheel control unit 30 in this embodiment respectively controlled the diagonally positioned brake mechanisms, an alternative control may be given by a single control unit to four brake mechanisms.

FIG. 8 and FIG. 9 are explanatory drawings illustrating other exemplary configurations of the electric brake device 10.

In FIG. 8 and FIG. 9, all equivalent parts will be given same reference numerals as in FIG. 1, to skip detailed description.

Referring to FIG. 8, in place of the first diagonal wheel control unit 28 and the second diagonal wheel control unit 30, there are provided a first all-wheel control unit 60 and a second all-wheel control unit 62 that respectively control the brake mechanisms (the front-left wheel brake mechanism 20, the front-right wheel brake mechanism 22, the rear-left wheel brake mechanism 24, and the rear-right wheel brake mechanism 26) for all of four wheels of the vehicle.

Now in either case where the first all-wheel control unit 60 or the second all-wheel control unit 62 went into failure, all wheels are kept brakable by increasing the braking force of four brake mechanisms with the aid of the other all-wheel control unit.

Also in case of failure of the front wheel control unit 32, the first all-wheel control unit 60 and the second all-wheel control unit 62 can still control the brake mechanisms 20, 22 for the left and right front wheels, so that the front wheel brake mechanism will be operable.

Even in case of failure of both of the first all-wheel control unit 60 and the second all-wheel control unit 62, the front wheel brake mechanisms 20, 22 having higher importance in braking remain operable owing to the front wheel control unit 32.

Referring to FIG. 9, in place of front wheel control unit 32, there is provided a third all-wheel control unit 64.

In this configuration, in case of failure of any one of, or any two of the first to third all-wheel control units 60, 62, 64, the braking force may be reserved by increasing the braking force of the brake mechanisms for all wheels of vehicle using the residual all-wheel control unit(s), and thereby redundancy of the electric brake device 10 may be improved.

As has been explained above, in the electric brake device 10 of the embodiment, four brake mechanisms 20, 22, 24, 26 can be controlled by three control units 28, 30, 32, posing an advantage of reducing the quantity of parts of the electric brake device 10 and reducing the vehicle cost.

According to the electric brake device 10, two control units are allocated to the left and right brake mechanism 20, 22 for the front wheels, and a single control unit is allocated to the left and right brake mechanisms 24, 26 for the rear wheels, so that even if one control unit should go into failure, the front wheel brake mechanisms remain controllable by the residual control unit, posing an advantage of enhancing redundancy of the front wheel brake generally distributed with larger braking force than the rear wheels.

According to the electric brake device 10, in case of failure of either one of the two diagonal wheel control units 28, 30, the front wheel control unit 32 increases the braking force of the front wheel brake mechanism having been controlled by the defective diagonal wheel control unit, and the other diagonal wheel control unit increases the braking force of the target brake mechanisms, making it possible to compensate the braking force having been reduced due to the failure of the diagonal wheel control unit, and to reserve the total braking force.

According to the electric brake device 10, in case of failure of the front wheel control unit 32, two diagonal wheel control units 28, 30 respectively increase the braking force of the target front wheel brake mechanisms, posing an advantage of keeping the braking force of the front wheel brake mechanisms generally distributed with larger braking force than the rear wheels.

According to the electric brake device 10, in case of failure of both of the two diagonal wheel control units 28, 30, the front wheel control unit 32 individually increases the braking force of the brake mechanisms 20, 22 for the left and right front wheels, posing an advantage of keeping the braking force of the front wheel brake mechanisms generally distributed with larger braking force than the rear wheels.

For the case where both of the two diagonal wheel control units 28, 30 went into failure to disable the rear wheel brake mechanisms 24, 26, the electric brake device 10 activates the parking brake mechanisms 34, 36 to produce the braking force for the rear-left wheel 16 and the rear-right wheel 18, posing an advantage of obtaining larger braking force.

The electric brake device 10 can control braking of the diagonally positioned wheels even when either one of the diagonal wheel control units 28, 30, and also the front wheel control unit 32 went into failure, posing an advantage of stabilizing the vehicle posture during braking.

According to the electric brake device 10, the individual brake mechanisms 20, 22, 24, 26 obtain the braking force by pressing the friction-applying member, while being powered by the electric actuator, against the friction-receiving member that rotates together with the wheel, posing an advantage of improving responsiveness to the brake operation as compared with the conventional hydraulic brake, and enabling various modes of brake operation adopted to the vehicle conditions.

According to the electric brake device 10, a disk brake system with a high heat radiation performance is built by employing a brake disk as the friction-receiving member, and a brake pad as the friction-applying member, posing an advantage of improving durability of the brake mechanism.

In the electric brake device 10, if the rear-left wheel brake mechanism 24 and the rear-right wheel brake mechanism 26 are designed to also function as the parking brake mechanisms 34, 36, the device will be advantageous in terms of reducing vehicle weight and simplifying vehicle configuration, as compared with the case where a dedicated parking brake mechanism is provided.

In the electric brake device 10, if an additional brake system is provided at the center of the brake disk to configure the parking brake mechanisms 34, 36, the device will be advantageous in terms of relieving the load of the individual brake mechanisms, as compared with the case where the rear-left wheel brake mechanism 24 and the rear-right wheel brake mechanism 26 also function as the parking brake mechanisms 34, 36.

The electric brake device 10 has two batteries for supplying power to the brake mechanisms 20, 22, 24, 26, so that if the main battery 40 should go into failure, the sub-battery 42 can activate the brake mechanisms 20, 22, 24, 26, posing an advantage of improving redundancy of the brake mechanisms 20, 22, 24, 26.

In the embodiment described above, although the definition was that the four wheels of vehicle include a first wheel pair composed of a first wheel and a second wheel arranged leaving a space in between in the width direction of vehicle, and a second wheel pair composed of a third wheel and a fourth wheel arranged leaving a space in between in the width direction, and arranged leaving a space from the first wheel pair in the length direction of vehicle, where the first wheel corresponds to the front-left wheel 12, the second wheel to the front-right wheel 14, the third wheel to the rear-left wheel 16, and the fourth wheel to the rear-right wheel 18, the definition may alternatively be such that the first wheel corresponds to the rear-left wheel 16, the second wheel to the rear-right wheel 18, the third wheel to the front-left wheel 12, and the fourth wheel to the front-right wheel 14.

In this case, the rear-left wheel brake mechanism 24 and the rear-right wheel brake mechanism 26 will be controlled individually by two control units (either one of the first diagonal wheel control unit 28 and the second diagonal wheel control unit 30, and the rear wheel control unit), and the front-left wheel brake mechanism 20 and the front-right wheel brake mechanism 22 will be controlled individually by a single control unit (either one of the first diagonal wheel control unit 28 and the second diagonal wheel control unit 30).

REFERENCE SIGNS LIST 10 electric brake device; 12 front-left wheel; 14 front-right wheel; 16 rear-left wheel; 18 rear-right wheel; 20 front-left wheel brake mechanism; 22 front-right wheel brake mechanism; 24 rear-left wheel brake mechanism; 26 rear-right wheel brake mechanism; 28 first diagonal wheel control unit; 30 second diagonal wheel control unit, 32 front wheel control unit, 34, 36 parking brake mechanism; 38 parking control unit; 40 main battery; 42 backup battery; 50 vehicle control unit; 52 brake pedal; 54 parking brake operating unit

The invention claimed is:

1. An electric brake device for a vehicle that has a first wheel pair composed of a first wheel and a second wheel arranged leaving a space in between in a width direction of the vehicle, and a second wheel pair composed of a third wheel and a fourth wheel arranged leaving a space in between in the width direction, and arranged leaving a space from the first wheel pair in a length direction of the vehicle, the device comprising:
   a first control unit that controls only a first brake mechanism for braking the first wheel, and a third brake mechanism for braking the third wheel positioned diagonal to the first wheel;
   a second control unit that controls only a second brake mechanism for braking the second wheel, and a fourth brake mechanism for braking the fourth wheel positioned diagonal to the second wheel; and
   a third control unit that controls the first brake mechanism and the second brake mechanism,
   wherein, when one of the first control unit and the second control unit is a failing control unit, the third control unit increases the braking force of one of the first brake mechanism and the second brake mechanism controlled by the failing control unit, while a non-failing control unit among the one of the first control unit and the second control unit increases the braking force of another one of the first brake mechanism and the second brake mechanism.

2. The electric brake device according to claim 1, wherein each of the brake mechanisms comprises a friction-receiving member that rotates together with the wheel; and
the electric brake device further comprising:
   a friction-applying member that moves while being powered by an electric actuator, and obtains the braking force by pressing the friction-applying member against the friction-receiving member.

3. The electric brake device according to claim 2, wherein each of the brake mechanisms comprises a brake disk that rotates together with the wheel, and an electric caliper that has a brake pad movable between the pressing position and the non-pressing position relative to the brake disk by aid of the electric actuator.

4. The electric brake device according to claim 3, wherein the third brake mechanism and the fourth brake mechanism also function as the parking brake mechanism, and the parking control unit activates the parking brake by moving the brake pads of the third brake mechanism and the fourth brake mechanism to the pressing position relative to the brake disk.

5. The electric brake device according to claim 3, wherein the parking brake mechanism comprises a brake drum that is provided in a hat positioned at the center of the brake disk of each of the third brake mechanism and the fourth brake mechanism, and is rotatable together with the wheel; and a brake shoe provided in each of the brake drums and movable between the pressing position and the non-pressing position relative to each brake drum by aid of an electric actuator for parking, and the parking control unit activates the parking brake by moving the brake shoe of the parking brake mechanism to the pressing position relative to the brake drum.

6. The electric brake device according to claim 3, wherein the parking brake mechanism comprises a brake drum that is provided in a hat positioned at the center of the brake disk of each of the third brake mechanism and the fourth brake mechanism, and is rotatable together with the wheel; and a brake shoe provided in each of the brake drums and movable between the pressing position and the non-pressing position relative to each brake drum by aid of a linear motion electric actuator, and the parking control unit activates the parking brake by moving the brake shoe of the parking brake mechanism to the pressing position relative to the brake drum.

7. The electric brake device of claim 1, wherein, in case of failure of the first control unit and the second control unit, the third control unit increases the braking force of each of the first brake mechanism and the second brake mechanism.

8. The electric brake device according to claim 7, further comprising:

parking brake mechanisms that apply braking force to each of the third wheel and the fourth wheel; and a parking control unit that controls the parking brake mechanisms, wherein, in case of failure of the first control unit and the second control unit, the parking control unit activates the parking brake mechanisms to generate braking force for the third wheel and the fourth wheel.

9. The electric brake device according to claim 1, wherein, in case of failure of the third control unit, the first control unit and the second control unit individually increase the braking force of their respective target front wheel brake mechanisms.

10. The electric brake device of claim 1, wherein, in case that one of the first control unit and the second control unit, and the third control unit is the failing control unit, the non-failing control unit among one of the first control unit and the second control unit increases the braking force of another one of the first brake mechanism and the second brake mechanisms.

11. The electric brake device of claim 1, wherein the first control unit additionally controls the second brake mechanism and the fourth brake mechanism, and the second control unit additionally controls the first brake mechanism and the third brake mechanism.

12. The electric brake device of claim 1, wherein the third control unit additionally controls the third brake mechanism and the fourth brake mechanism.

13. The electric brake device according to claim 1, wherein each of the brake mechanisms is connected to a main battery and a backup battery that serve as power sources for controlling and activating the brake mechanisms, and, in case of main battery failure, the power source for each brake mechanism is switched to the backup battery.

14. The electric brake device according to claim 1, wherein the first wheel is the front-left wheel, the second wheel is the front-right wheel, the third wheel is the rear-left wheel, and the fourth wheel is the rear-right wheel;

the first brake mechanism is the front-left wheel brake mechanism, the second brake mechanism is the front-right wheel brake mechanism, the third brake mechanism is the rear-left wheel brake mechanism, and the fourth brake mechanism is the rear-right wheel brake mechanism; and the first control unit is a first diagonal wheel control unit, the second control unit is a second diagonal wheel control unit, and the third control unit is a front wheel control unit.

\* \* \* \* \*